United States Patent
Noda et al.

(10) Patent No.: US 10,063,967 B2
(45) Date of Patent: Aug. 28, 2018

(54) SOUND COLLECTING DEVICE AND SOUND COLLECTING METHOD

(71) Applicant: Panasonic Intellectual Property Management Co., Ltd., Osaka (JP)

(72) Inventors: Yuki Noda, Osaka (JP); Kou Watanabe, Osaka (JP); Takeshi Hatakeyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 2 days.

(21) Appl. No.: 15/412,217

(22) Filed: Jan. 23, 2017

(65) Prior Publication Data
US 2017/0280238 A1    Sep. 28, 2017

(30) Foreign Application Priority Data

Mar. 22, 2016  (JP) .................................. 2016-056475
Dec. 12, 2016  (JP) .................................. 2016-239974

(51) Int. Cl.
| | | |
|---|---|---|
| *H04R 3/00* | (2006.01) | |
| *G06T 7/00* | (2017.01) | |
| *G06K 9/00* | (2006.01) | |
| *G06T 7/70* | (2017.01) | |
| *G10L 25/78* | (2013.01) | |

(Continued)

(52) U.S. Cl.
CPC ......... *H04R 3/005* (2013.01); *G06K 9/00255* (2013.01); *G06T 7/70* (2017.01); *G10L 25/78* (2013.01); *H04N 7/15* (2013.01); *H04R 1/406* (2013.01); *H04R 2201/401* (2013.01); *H04R 2430/21* (2013.01)

(58) Field of Classification Search
CPC .. H04R 2201/401; H04R 1/406; H04R 3/005; H04R 2430/21; H04N 7/15; G10L 25/78; G06T 7/70; G06K 9/00255
See application file for complete search history.

(56) References Cited

U.S. PATENT DOCUMENTS 7,843,486 B1 *  11/2010  Blair .................... H04M 3/568
                                                      348/14.01
2002/0047895 A1 *  4/2002  Bernardo ............... G01C 11/02
                                                         348/48

(Continued)

FOREIGN PATENT DOCUMENTS

| | | |
|---|---|---|
| JP | 2006-211178 | 8/2006 |
| JP | 2007-174155 | 7/2007 |

(Continued)

*Primary Examiner* — Davetta W Goins
*Assistant Examiner* — Kuassi Ganmavo
(74) *Attorney, Agent, or Firm* — McDermott Will & Emery LLP (57) ABSTRACT

A sound collecting device includes a sound source position input interface that receives input of sound source position information indicating a sound source position, an audio interface that receives input of sound signals collected by two or more sound collecting units placed at predetermined positions in advance, a recording medium in which sound collecting unit placement information indicating placement information of the sound collecting units is stored, and a controller that selects one of the sound signals output from the sound collecting units, based on the sound source position information and the sound collecting unit placement information.

18 Claims, 6 Drawing Sheets

(51) Int. Cl.
*H04N 7/15* (2006.01)
*H04R 1/40* (2006.01)

(56) References Cited

U.S. PATENT DOCUMENTS

| | | | |
|---|---|---|---|
| 2006/0165242 A1 | 7/2006 | Miki et al. | |
| 2006/0165259 A1* | 7/2006 | Ogawa | G01S 5/0072 |
| | | | 382/104 |
| 2006/0245601 A1* | 11/2006 | Michaud | G01S 5/22 |
| | | | 381/92 |
| 2007/0160240 A1 | 7/2007 | Ito et al. | |
| 2010/0150372 A1 | 6/2010 | Ito et al. | |
| 2010/0208914 A1* | 8/2010 | Ohtsuka | H04R 3/005 |
| | | | 381/86 |
| 2011/0082690 A1* | 4/2011 | Togami | H04R 1/406 |
| | | | 704/201 |
| 2012/0124602 A1* | 5/2012 | Tan | G09B 5/06 |
| | | | 725/9 |
| 2012/0224714 A1* | 9/2012 | Couse | H04R 1/406 |
| | | | 381/92 |
| 2014/0241529 A1* | 8/2014 | Lee | H04R 5/027 |
| | | | 381/26 |
| 2014/0362215 A1 | 12/2014 | Yoshio et al. | |
| 2014/0376740 A1* | 12/2014 | Shigenaga | G06F 21/60 |
| | | | 381/92 |
| 2015/0350621 A1 | 12/2015 | Sawa et al. | |
| 2016/0111109 A1* | 4/2016 | Tsujikawa | B60R 11/0247 |
| | | | 704/226 |
| 2016/0142620 A1 | 5/2016 | Sawa et al. | |
| 2017/0142243 A1* | 5/2017 | Hua | H04M 1/6033 |
| 2017/0238109 A1* | 8/2017 | Gong | H04R 29/005 |
| | | | 381/58 |

FOREIGN PATENT DOCUMENTS

| | | | |
|---|---|---|---|
| JP | 2008-193196 | 8/2008 | |
| JP | 2011-080868 | 4/2011 | |
| WO | 2013/114862 | 8/2013 | |
| WO | 2014/103331 | 7/2014 | |
| WO | 2014/125835 | 8/2014 | |
| WO | WO 2017023298 A1 * | 2/2017 | G01S 5/00 |

* cited by examiner

SOUND COLLECTING DEVICE AND SOUND COLLECTING METHOD

BACKGROUND

1. Technical Field

The present disclosure relates to a sound collecting device and a sound collecting method for collecting a sound.

2. Description of the Related Art

Unexamined Japanese Patent Publication No. 2008-193196 discloses a configuration for generating, when a specific object is designated for a captured image, a synthesized sound signal corresponding to the object, from a plurality of sound signals. With this configuration, only a sound emitted from the designated object can be emphasized and reproduced.

SUMMARY

The present disclosure provides a sound collecting device and a sound collecting method that are effective for sound collection at a designated position.

A sound collecting device according to an exemplary embodiment of the present disclosure includes a sound source position input interface that receives input of sound source position information indicating a sound source position, an audio interface that receives input of sound signals collected by two or more sound collecting units placed at predetermined positions in advance, a recording medium that stores sound collecting unit placement information indicating placement information of the sound collecting units, and a controller that selects one of the sound signals output from the sound collecting units, based on the sound source position information and the sound collecting unit placement information.

A sound collecting method according to an exemplary embodiment of the present disclosure includes a first step of receiving input of sound source position information indicating a sound source position, a second step of receiving input of two or more sound signals collected by sound collecting units placed at predetermined positions in advance, and a third step of selecting one of the sound signals output from the sound collecting units, based on the sound source position information and sound collecting unit placement information indicating placement information of the sound collecting units.

The sound collecting device and the sound collecting method according to the present disclosure are effective for sound collection at a designated position.

DETAILED DESCRIPTION

Hereinafter, exemplary embodiments will be described in detail, with reference to the drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the accompanying drawings and the following description are provided for those skilled in the art to well understand the present disclosure and are not intended to limit the subjects described in the claims.

First Exemplary Embodiment

1. Configurations of Sound Collecting System and Sound Collecting Device

Figure 1:
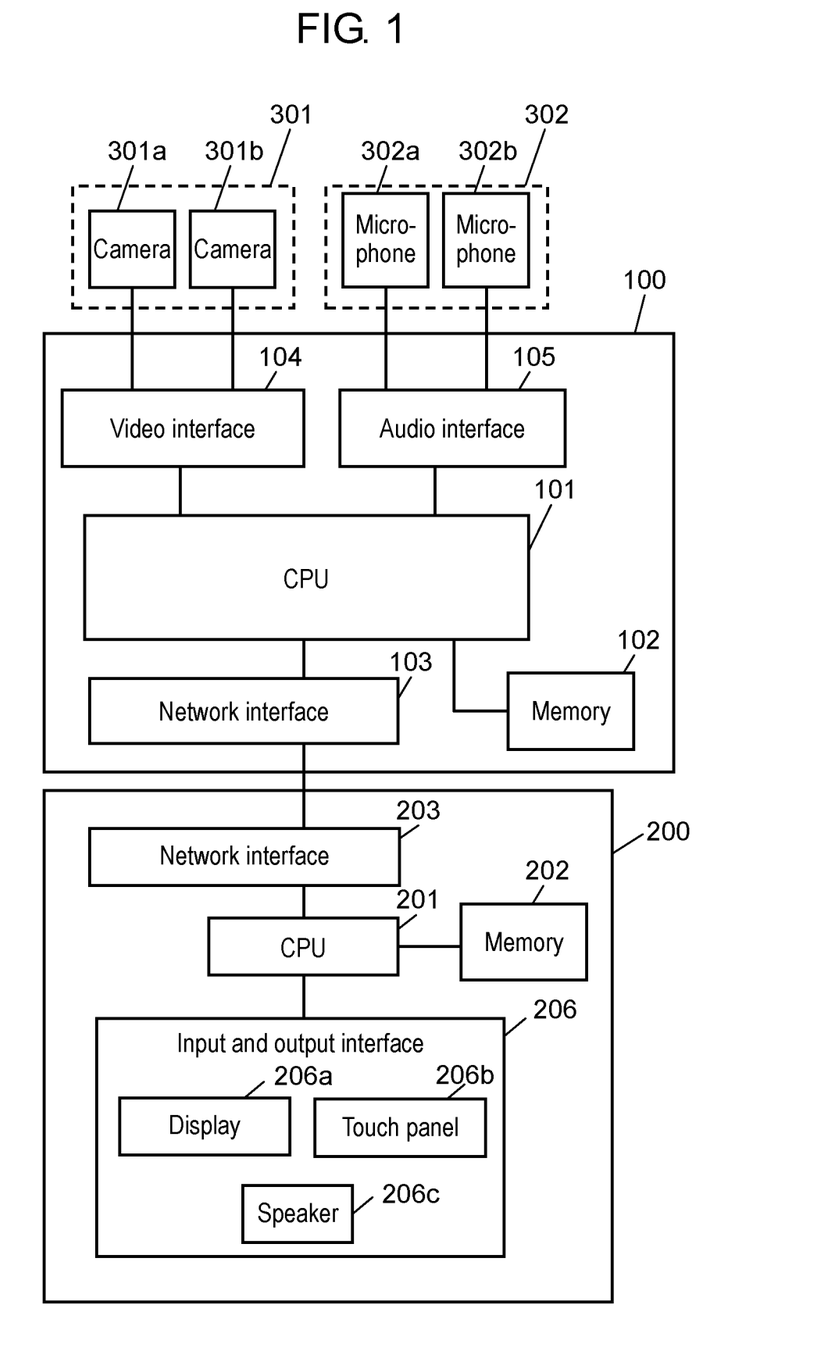
FIG. 1 is a block diagram illustrating a configuration of a sound collecting system including a sound collecting device according to a first exemplary embodiment.

FIG. 1 is a block diagram illustrating a configuration of a sound collecting system including a sound collecting device according to a first exemplary embodiment. In FIG. 1, the sound collecting system includes sound collecting device 100, client 200, camera 301a, camera 301b, microphone 302a, and microphone 302b. Camera 301a and camera 301b are collectively referred to as cameras (imaging units) 301. In the present exemplary embodiment, a configuration including two cameras 301 will be described; however, the number of cameras 301 may be at least one. Microphone 302a and microphone 302b are collectively referred to as microphones (sound collecting units) 302. In the present exemplary embodiment, a configuration including two microphones 302 will be described; however, the number of microphones 302 may be at least two.

Sound collecting device 100 includes CPU (controller) 101, memory (recording medium) 102, network interface (sound source position input interface) 103, video interface 104, and audio interface 105.

CPU 101 executes a computer program stored in memory 102, and selects an optimal microphone among microphones 302 used for sound collection. With this selection, a piece of sound data output from microphones 302 is selected. A method for selecting the optimal microphone will be described later.

Memory (recording medium) 102 stores positional coordinates at which cameras 301 and microphones 302 are placed, in a coordinate system that is arbitrarily defined in a space where the sound collecting system is installed. The positional coordinates of microphones 302 are examples of sound collecting unit placement information indicating placement information of microphones 302. The positional coordinates of cameras 301 are examples of imaging unit placement information indicating placement of cameras 301.

In addition, memory 102 stores specific position information indicating one or more specific positions in a predetermined space. Example of the specific position information is a sound source position, positions of seats placed or so on in the predetermined space (the details thereof will be described later.)

Network interface (sound source position input interface) 103 is configured to establish communications of sound collecting device 100 with client 200. Network interface 103 receives sound source position information indicating a sound source position. More specifically, network interface 103 receives a pixel position in image data, which indicates the sound source position of the sound (an example of sound source position information) from client 200, and transmits the pixel position to CPU 101. Further, network interface 103 transmits to client 200 image data and sound data sent from CPU 101.

Video interface 104 is configured to connect cameras 301 to CPU 101. More specifically, image interface 104 is connected to one or more cameras (imaging units) 301 placed in advance at a predetermined position to capture images of a predetermined range.

Audio interface 105 is configured to connect microphones 302 to CPU 101. Audio interface 105 receives two sound signals that are collected by microphones (sound collecting units) 302 placed in advance at predetermined positions.

Client 200 includes CPU 201, memory 202, network interface 203, and input and output interface 206. Client 200 is connected to sound collecting device 100 via network interface 203.

Input and output interface 206 includes, for example, display 206a, touch panel 206b, and speaker 206c. Display 206a receives image data captured by cameras 301 through sound collecting device 100 to display the received image data. A user designates a specific position in an image, using touch panel 206b on display 206a. Speaker 206c receives sound data collected by microphones 302 through sound collecting device 100 to reproduce the received sound data.

Cameras 301 are installed, for example, at a ceiling part in a cabin of an aircraft. Cameras 301 send the captured image data to sound collecting device 100.

Microphones 302 are installed, for example, at the ceiling part in the cabin of the aircraft. Microphones 302 send the collected sound data to sound collecting device 100.

CPU 101 is an example of a controller. Memory 102 is an example of a recording medium. Network interface 103 is an example of a sound source position input interface for receiving the sound source position information indicating the sound source position of the sound. Cameras 301 are examples of imaging units. Microphones 302 are examples of sound collecting units.

2. Operation of Sound Collecting Device

Hereafter, an operation of sound collecting device 100 configured as described above will be described.

Figure 2:
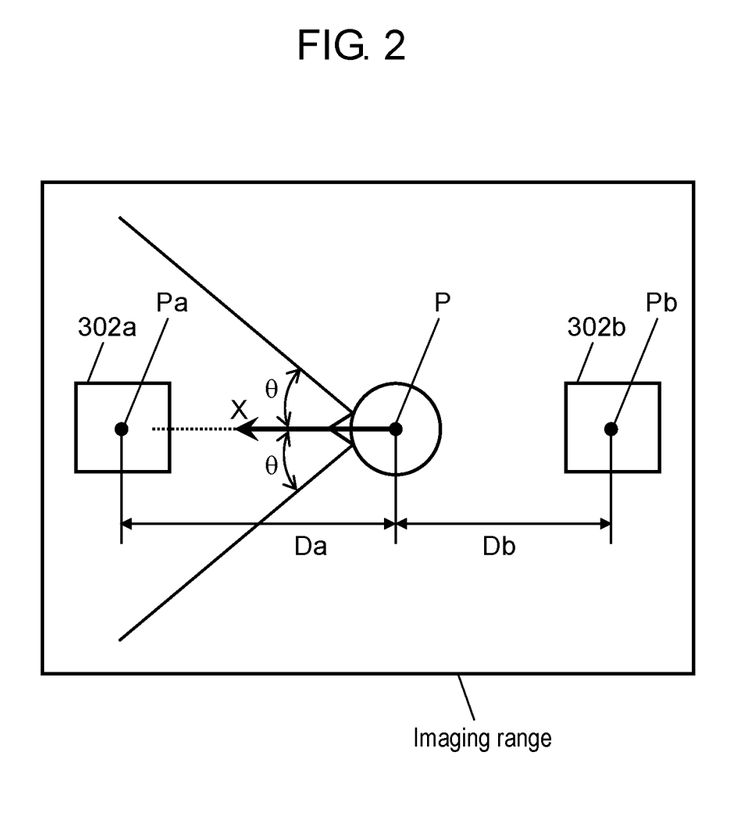
FIG. 2 is an overhead view illustrating an example of a relationship among a sound source position, positions of microphones, and an imaging range of a camera, in the first exemplary embodiment.

FIG. 2 is an overhead view illustrating an example of a relationship among the sound source position, the positions of microphones 302, and the imaging range to be captured by cameras 301. In FIG. 2, cameras 301 are installed, for example, at the ceiling part in the cabin of the aircraft. Therefore, the imaging range is set to fall within a frame illustrated in FIG. 2. The head and nose of a passenger viewed from above appear near a center of the imaging range in FIG. 2. Positions of the imaged head and nose indicate that the passenger is directed to the left direction in FIG. 2. More specifically, it is considered that the passenger stands (or sits) with microphone 302a located ahead of the passenger and microphone 302b located behind the passenger. Here, sound source position P is designated as an arbitrary position in the imaging range. In FIG. 2, sound source position P indicates a position at which the passenger is present.

Microphone 302a is placed at the position in FIG. 2, which is spaced apart from sound source position P (the position at which the passenger is present) by distance Da, and its positional coordinate is expressed as microphone position Pa. In other words, microphone 302a is located at place Pa ahead of the passenger, which is spaced apart from the passenger by distance Da.

Microphone 302b is placed at the position in FIG. 2, which is spaced apart from sound source position P by distance Db, and its positional coordinate is expressed as microphone position Pb. In other words, microphone 302b is located at place Pb behind the passenger, which is spaced apart from the passenger by distance Db. Microphones 302 may be placed outside the imaging range of cameras 301.

Hereafter, the operation of the sound collecting device according to the present exemplary embodiment will be described, using a case with the above placement relationship as an example.

Figure 3:
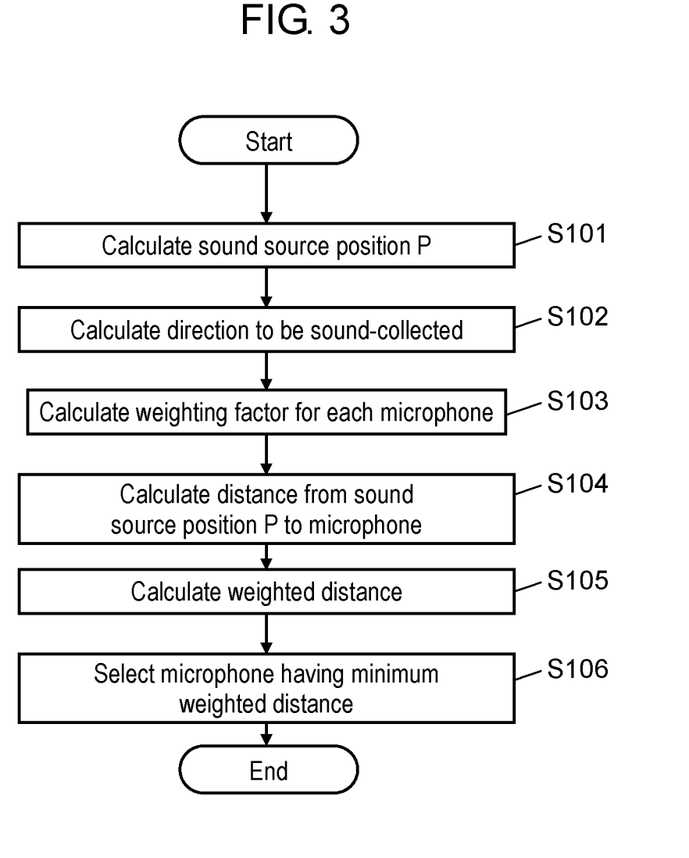
FIG. 3 is a flowchart illustrating processing of the sound collecting device according to the first exemplary embodiment.

FIG. 3 is a flowchart illustrating processing of sound collecting device 100 according to the present exemplary embodiment.

In FIG. 3, when receiving designation of the sound source position (the position at which a certain passenger is present in the aircraft) from client 200, sound collecting device 100 first calculates sound source position P (S101).

Sound source position P is designated as described below, for example. Input and output interface 206 in client 200 includes display 206a and touch panel 206b (see FIG. 1). Display 206a receives the image data captured by cameras 301 via sound collecting device 100 to display the received image data. The user then designates the arbitrary position in the image displayed on display 206a, using touch panel 206b. CPU 201 in client 200 calculates a pixel position corresponding to the designated position (an example of sound source position information) in the image. Further, CPU 201 sends the calculated pixel position to sound collecting device 100 via network interface 203. Thus, CPU 101 in sound collecting device 100 calculates sound source position P from the pixel position in the image, as a coordinate in the coordinate system that is arbitrarily defined in the space where the sound collecting system is installed, based on the image data captured by cameras 301 and the positions of the cameras 301.

Subsequently, CPU (controller) 101 in sound collecting device 100 determines whether a person (passenger) is present within a certain distance range from the designated position in the image. The certain distance range is typically a distance of several centimeters to several meters.

The determination whether the person is present is made as follows. CPU 101 recognizes positions of the head and nose of the person (passenger) from the image in the imaging range. When determining that the person is present in the image, CPU 101 recognizes the positions of the head and nose of the person, and thus calculates face direction X indicating a direction to which the person is directed, as a direction to be sound-collected (S102). The direction to be sound-collected is a direction in which an object emitting a sound to be collected emits the sound. In other words, the direction to be sound-collected is a direction in which the sound to be collected is emitted. More specifically, in a case of the person (passenger), since the person emits the sound in face direction X that is the direction to which the person is directed, face direction X is specified as the direction to be sound-collected.

Further, CPU 101 calculates a weighting factor for each microphone 302, based on a relative position with sound source position P and face direction X as references (S103). Next, a method for determining the weighting factors in the present exemplary embodiment will be described with reference to FIG. 2.

CPU 101 gives weighting factor w1 to microphones 302 located within an angle range from −θ to +θ centering around sound source position P with a direction indicated by face direction X as a reference. CPU 101 gives weighting factor w2 that is larger than weighting factor w1, to microphones 302 located outside the angle range from −θ to +θ. More specifically, in the case of the placement relationship illustrated in FIG. 2, CPU 101 gives weighting factor w1 to microphone 302a located within the angle range from −θ to +θ, and gives weighting factor w2 to microphone 302b located outside the angle range from −θ to +θ.

Values of angle θ, weighting factor w1, and weighting factor w2 are determined as prior information, for example, based on knowledge about dependency between attenuation of a sound pressure level of a sound emitted by a person and an angle with respect to a face direction of the person. The values of angle θ, weighting factor w1, and weighting factor w2 are stored in memory 102 in sound collecting device 100, as processing parameters for CPU 101.

CPU 101 then calculates linear distances Da and Db from sound source position P to respective microphones 302a and 302b, based on the coordinates of microphone positions Pa and Pb stored in memory (recording medium) 102 and the calculated coordinate of sound source position P (S104).

Further, CPU 101 calculates weighted distances Dwa and Dwb from sound source position P to respective microphones 302a and 302b, based on weighting factors w1 and w2 determined for microphones 302 and calculated linear distances Da and Db (S105).

Weighted distances Dwa and Dwb are calculated from, for example, the following relational expressions.

$$Dwa = Da \times w1$$

$$Dwb = Db \times w2$$

Finally, CPU 101 selects a sound signal corresponding to microphone 302 that has a minimum one of the weighted distances from sound source position P to respective microphones 302 (S106). More specifically, CPU (controller) 101 selects the sound signal corresponding to the sound collecting unit that has the minimum one of the weighted distances calculated based on the weighting factors determined by a relative positional relationship between the position indicated by the sound source position information and the positions indicated by the sound collection unit placement information, and the linear distances between sound source position P and the respective sound collection units.

The selected sound signal is sent to, for example, client 200. Then, the user can listen to the sound reproduced by speaker 206c of input and output interface 206. Thus, the processing of sound collecting device 100 is completed.

As described above, sound collecting device 100 according to the present exemplary embodiment gives weighting factor w1 to microphones 302 located within the angle range from −θ to +θ, with face direction X as a reference. Further, sound collecting device 100 according to the present exemplary embodiment gives weighting factor w2 that is larger than weighting factor w1, to microphones 302 located outside the angle range from −θ to +θ. Therefore, the weighted distances of microphones 302 located within the angle range from −θ to +θ tend to have a relatively small value.

More specifically, CPU 101 selects the sound signal corresponding to the sound collecting unit that has the minimum one of the weighted distances (Dwa, Dwb) calculated based on the weighting factors (w1, w2) determined by the relative positional relationship between the position indicated by the sound source position information and the positions indicated by the sound collection unit placement information, and the linear distances (Da, Db) between sound source position P and respective microphones (sound collection units) 302.

With the selection method described above, microphones 302 located within the angle range from −θ to +θ, that is, microphones 302 located in face direction X that is small in attenuation of the sound pressure level of the sound emitted by the person tend to be able to be selected easily. Accordingly, sound collecting device 100 according to the present exemplary embodiment can effectively collect the sound at the designated position.

With regard to weighting factors w1 and w2, for example, the value of weighting factor w2 that is given to microphones 302 located outside the angle range from −θ to +θ may be set to a considerably larger value than that of weighting factor w1. In this case, the weighted distances corresponding to microphones 302 located outside the angle range from −θ to +θ become satisfactorily large in comparison with the weighted distances corresponding to microphones 302 located within the angle range from −θ to +θ. Hence, when microphone 302 that has the minimum one of the weighted distances is selected, microphones 302 located outside the angle range from −θ to +θ can be set not to be selected. In other words, CPU 101 selects the sound signal corresponding to microphone 302 that has the minimum one of the linear distances between respective microphones 302 and sound source position P calculated based on the sound source position information and the sound collecting unit arrangement information, of microphones 302 located within the predetermined angle range (−θ to +θ) centering around the direction to be sound-collected (face direction X) with sound source position P as a reference.

Without using weighting factors w1 and w2, CPU 101 may select the sound signal corresponding to microphone 302 that has the minimum one of the linear distances between sound source position P and respective microphones 302, of microphones 302 located within the predetermined angle range (−θ to +θ) centering around the direction to be sound-collected (face direction X) with sound source position P as a reference.

By using the above described methods, the optimal microphone is selected to effectively collect the sound at the designated position.

The coordinate system that is arbitrarily defined in the space where the sound collecting system is installed may be a two-dimensional coordinate system ignoring height information, or may be a three-dimensional coordinate system taking the height information into consideration. In the case of the three-dimensional coordinate system, a height of the sound source position is calculated based on image data captured by two or more cameras 301 and the positional coordinates of cameras 301 stored in memory 102.

3. Advantageous Effects

As described above, sound collecting device 100 according to the present exemplary embodiment includes network interface (sound source position input interface) 103 that receives input of the sound source position information indicating the sound source position, audio interface 105 that receives input of the two or more sound signals collected by microphones 302 placed at the predetermined positions in advance, memory (recording medium) 102 that stores the sound collecting unit placement information indicating the placement information of microphones 302, and CPU (controller) 101 that selects one of the sound signals output from microphones (sound collecting units) 302, based on the sound source position information and the sound collecting unit placement information.

With this configuration, CPU 101 tends to be able to select appropriate microphone 302 that can collect the sound at the designated position.

Second Exemplary Embodiment

A second exemplary embodiment will be described with reference to FIGS. 3 and 4.

Figure 4:
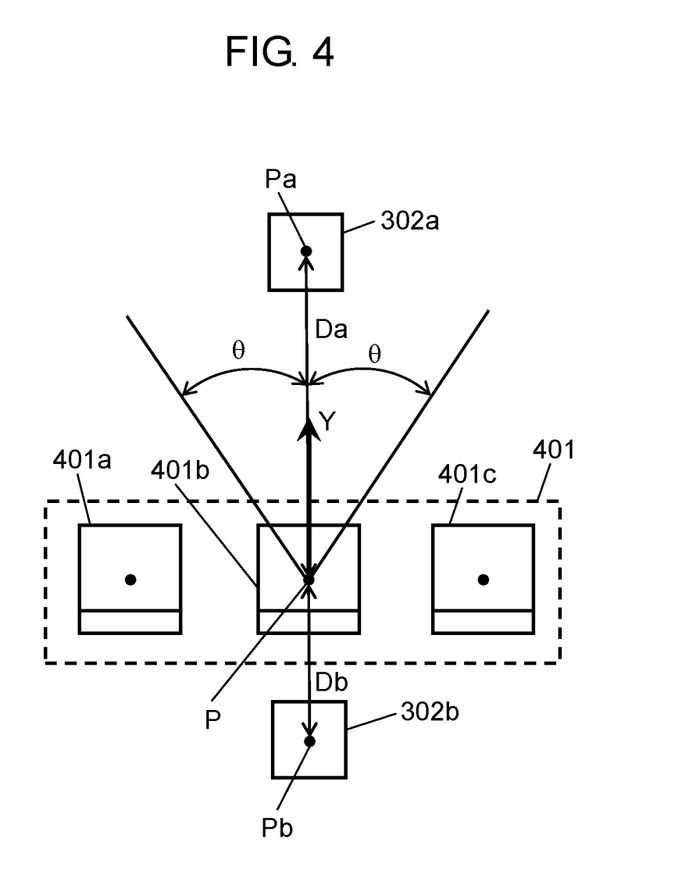
FIG. 4 is an overhead view illustrating an example of a relationship between positions of seats and those of microphones, in a second exemplary embodiment.

FIG. 4 is an overhead view (a part of an entire seat layout) illustrating an example of a positional relationship between seats 401a, 401b, and 401c and microphones (sound collecting units) 302. A sound collecting system according to the second exemplary embodiment is different from the sound collecting system according to the first exemplary embodiment in a calculation method of sound source position P (step S101) and a calculation method of a direction to be sound-collected (step S102), in the processes for selecting a microphone in the sound collecting device illustrated in FIG. 3. Other configurations and operations are similar to those of the first exemplary embodiment (see FIG. 1); therefore, the detailed description thereof will not be given.

First, the calculation method of sound source position P (step S101) in sound collecting device 100 according to the present exemplary embodiment will be described. In the present exemplary embodiment, input and output interface 206 of client 200 includes display 206a and touch panel 206b (see FIG. 1). Memory 202 of client 200 stores data of the layout of seats placed at predetermined positions in a space.

Display 206a displays the layout. The user can designate an arbitrary seat, using the touch panel while viewing the layout displayed on display 206a. When the user designates the arbitrary seat, client 200 sends a designated seat number (sound source position information) to sound collecting device 100 via network interface 203 in client 200.

Memory 102 (recording medium) in sound collecting device 100 stores a layout database associating positional coordinates of the seats with seat numbers, in the coordinate system that is arbitrarily defined in the space where the sound collecting system is installed. In other words, the positions of the seats arranged in the predetermined space are included in specific position information indicating specific positions, and the specific position information is stored in memory 102.

Since a passenger sits on a seat, one of the positions of the seats arranged in the predetermined space can be the sound source position. Therefore, when receiving the designation of the seat number, sound collecting device 100 refers to the layout database of the seats stored in memory 102, and determines, as sound source position P, a positional coordinate of the seat associated with the designated seat number.

Next, the calculation method of the direction to be sound-collected (step S102) in the present exemplary embodiment will be described. In the present exemplary embodiment, seat arrangement direction Y of the seat associated with the designated seat number is determined as the direction to be sound-collected. Seat arrangement direction Y refers to a direction to which a front surface of a backrest (a surface to be brought into contact with the back of a sitting person) of the designated seat is directed. In other words, seat arrangement direction Y refers to a direction to which the face of the passenger (person) is ordinarily directed when the passenger sits on the seat.

When all the seats in the space are directed to the same seat arrangement direction, seat arrangement direction Y may be set as a processing parameter for CPU (controller) 101 in sound collecting device 100. Further, when the seat arrangement direction in the space differs depending on each seat, a plurality of seat arrangement directions Y may be stored in the layout database of the seats, as information in which seat arrangement directions Y are respectively associated with the seat numbers. Further, CPU 101 may read seat arrangement direction Y associated with the designated seat number from the layout database of the seats, and may set the direction as the direction to be sound-collected. The subsequent processes are similar to those of the first exemplary embodiment; therefore, the detailed description thereof will not be given.

To clarify a difference between the direction to be sound-collected in the first exemplary embodiment and that in the second exemplary embodiment, a description will be made with reference to FIG. 4. In FIG. 4, seats 401 are illustrated by extracting seats 401a, 401b, and 401c as a part of the seats arranged in the space. Of seats 401, seat 401b is assumed to be designated as sound source position P.

Microphone 302a is placed at the position in FIG. 4, which is spaced apart from sound source position P (the position where the passenger sits) by distance Da, and its positional coordinate is expressed as microphone position Pa. In other words, microphone 302a is located at place Pa ahead of the sitting passenger, which is spaced apart from the passenger by distance Da.

Microphone 302b is placed at the position in FIG. 4, which is spaced apart from sound source position P by distance Db, and its positional coordinate is expressed as microphone position Pb. In other words, microphone 302b is located at place Pb behind the sitting passenger, which is spaced apart from the passenger by distance Db.

In those indications, face direction X in FIG. 2 is simply replaced with one of seat arrangement directions Y, and the processing method is unchanged. With this configuration, microphones 302 located within the angle range from $-\theta$ to $+\theta$, that is, microphones 302 that is small in attenuation of a sound pressure level of a sound emitted at the seat position and are located ahead in the seat arrangement direction tend to be able to be selected.

For example, CPU (controller) 101 in sound collecting device 100 selects a sound signal corresponding to a microphone (sound collecting unit) 302 that has a minimum one of weighted distances (Dwa, Dwb) calculated based on weighting factors (w1, w2) determined by a relative positional relationship between the sound source position information and the sound collection unit placement information with one of seat arrangement directions Y as a reference, and linear distances (Da, Db) between sound source position P and respective microphones (sound collection units) 302.

Further, sound source position P may be selected from one or more seats arranged in a predetermined direction, and CPU 101 may select a sound collecting unit that has a minimum one of linear distances between respective microphones (sound collecting units) 302 and sound source position P calculated based on the sound source position information and the sound collecting unit placement information, of microphones (sound collecting units) 302 present in the predetermined direction with respect to sound source position P. Further, the predetermined direction may be a frontward direction with respect to sound source position P.

Third Exemplary Embodiment

A third exemplary embodiment will be described with reference to FIGS. 5 and 6. Configurations of a sound collecting system according to the third exemplary embodiment are similar to those of the first exemplary embodiment (see FIG. 1); therefore, the detailed description thereof will not be given. For example, a configuration for designating sound source position P is similar to that of the first exemplary embodiment.

Figure 5:
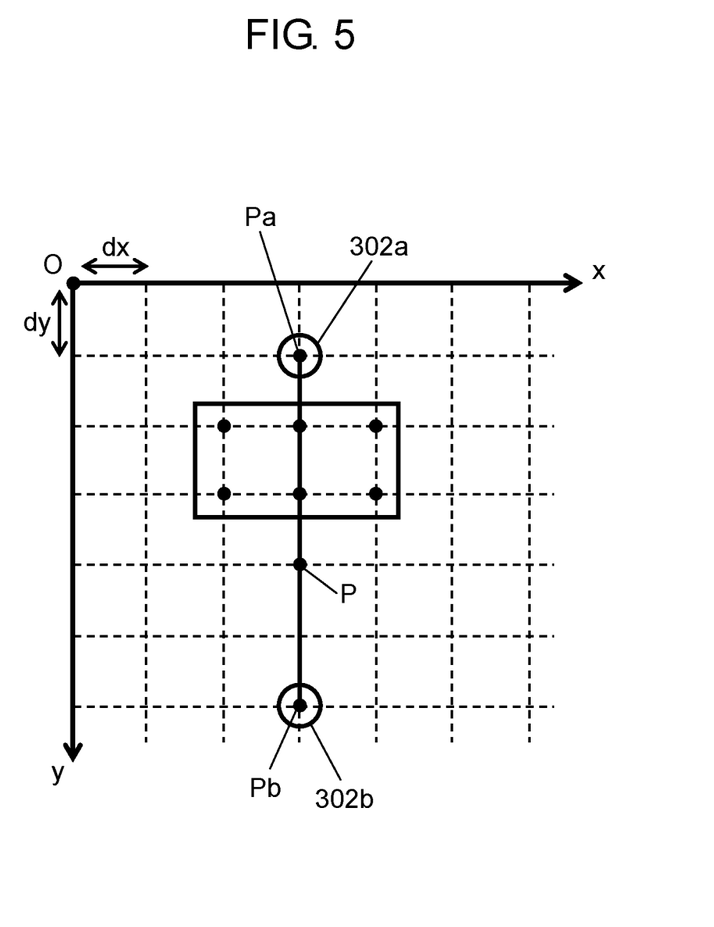
FIG. 5 is an overhead view illustrating an example of a relationship among a sound source position, positions of microphones, and placement of an obstacle, in a third exemplary embodiment.

FIG. 5 is an overhead view (a part of a layout) illustrating an example of a placement relationship among sound source position P, positions of microphones (sound collecting units) 302, and an obstacle. In FIG. 5, the placed obstacle has the same height as a height of a space. In other words, the case described in FIG. 5 is a simple example that can be handled as a two-dimensional coordinate system in which height information of sound source position P, position Pa of microphone 302a, and position Pb of microphone 302b can be ignored.

Origin O of a discrete coordinate system in the space, which is arbitrarily defined in the space, is assumed to be set at the position in FIG. 5. Further, in the discrete coordinate system, dx is a minimum unit of distance defined in an x-direction (right direction in FIG. 5), and dy is a minimum unit of distance defined in a y-direction (downward direction in FIG. 5). Positions of a person and an object are expressed with integral multiples of dx and dy.

When sound source position P in FIG. 5 is designated as an arbitrary position in accordance with the coordinate system, the coordinates of sound source position P are (3dx, 4dy).

Microphone 302a is placed at the position in FIG. 5, and positional coordinates Pa of microphone 302a are (3dx, dy). Similarly, microphone 302b is placed at the position in FIG. 5, and positional coordinates Pb of microphone 302b are (3dx, 6dy).

Further, an object having the same height as the height of the space is placed as the obstacle at the position in FIG. 5. More specifically, coordinates (2dx, 2dy), (3dx, 2dy), (4dx, 2dy), (2dx, 3dy), (3dx, 3dy), and (4dx, 3dy) that correspond to a placement range of the object on the discrete coordinates are assumed to be stored in memory (recording medium) 102 in sound collecting device 100 as a database (placement information of object).

Hereafter, an operation of sound collecting device 100 according to the present exemplary embodiment will be described, using the case with the above placement relationship as an example.

Figure 6:
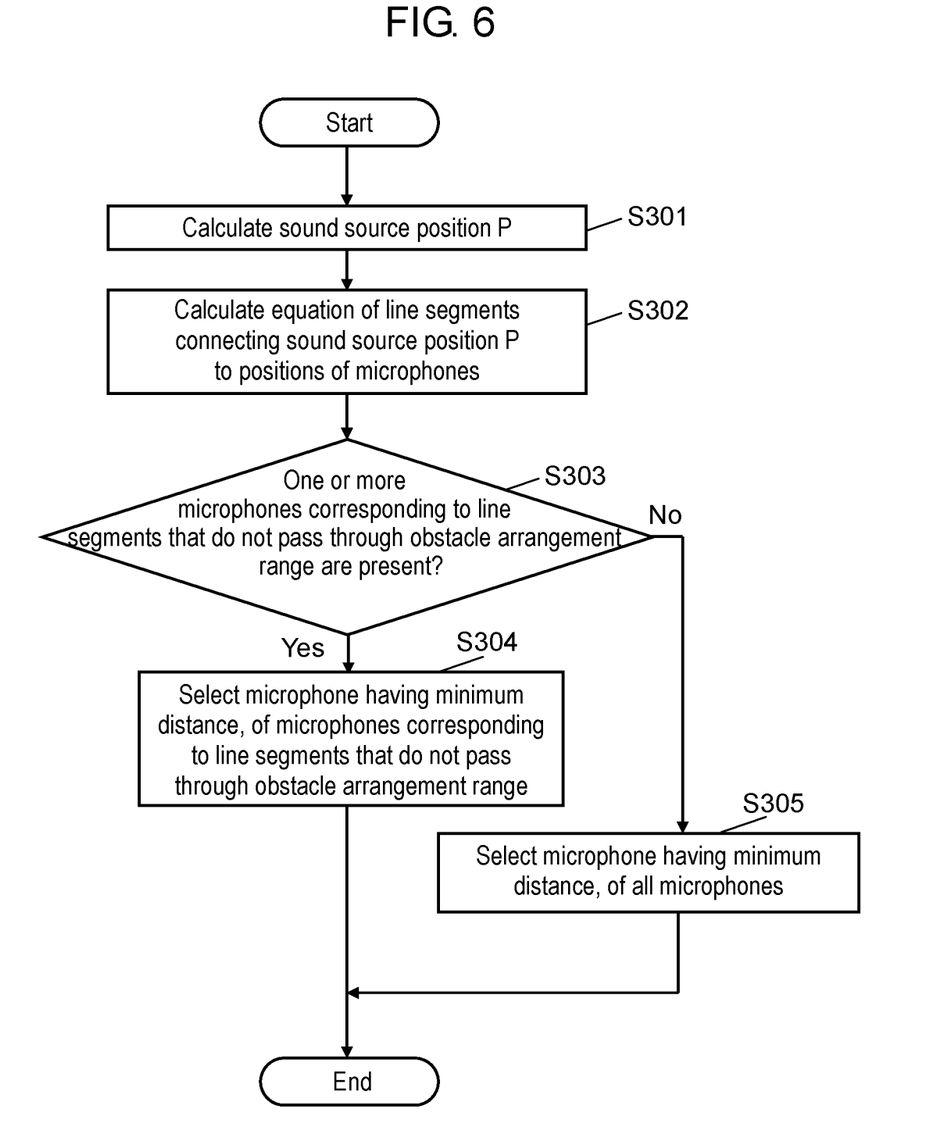
FIG. 6 is a flowchart illustrating processing of a sound collecting device according to the third exemplary embodiment.

FIG. 6 is a flowchart illustrating processes of sound collecting device 100 according to the present exemplary embodiment. In FIG. 6, when receiving the designation of the sound source position from client 200, sound collecting device 100 calculates sound source position P (S301). Sound source position P is designated with a method similar to the method described in the first exemplary embodiment. CPU (controller) 101 calculates equations of line segments each connecting sound source position P to position Pa of microphone 302a and position Pb of microphone 302b, based on coordinates of sound source position P and the coordinates of microphone 302a and microphone 302b (S302).

For example, when the coordinates of sound source position P are (Px1, Py1), and the coordinates of a position of one of microphones 302 are (Px2, Py2), an equation of a line segment connecting sound source position P to the position of the one of microphones 302 can be expressed as follows.

In $Px1 \neq Px2$, $$Y=(Py2-Py1)/(Px2-Px1) \times (X-Px1)+Py1, \qquad (i)$$

where $Px1 <= X <= Px2$ (assuming that $Px1 < Px2$ is satisfied).

In $Px1=Px2$, and $Py1 \neq Py2$, $$X=Px1, \qquad (ii)$$

where $Py1 <= Y <= Py2$ (assuming that $Py1 < Py2$ is satisfied).

In the case of the example illustrated in FIG. 5, an equation of a line segment connecting sound source position P to position Pa of microphone 302a can be expressed as follows.

$$X=3dx, \text{ where } 1dy<=Y<=4dy.$$

Further, an equation of a line segment connecting sound source position P to position Pb of microphone 302b can be expressed as follows.

$$X=3dx, \text{ where } 4dy<=Y<=6dy.$$

Next, CPU (controller) 101 selects a sound signal corresponding to microphone 302 that has a minimum one of linear distances between sound source position P and the positions of respective microphones 302, of microphones 302 in which the object is not present on the line segments connecting sound source position P to the positions of respective microphones 302, based on sound source position P, the position of respective microphones 302, and the placement information of the object. More specifically, CPU 101 first determines whether one or more microphones 302 in which the object is not present between sound source position P and respective microphones 302 are present. Specifically, CPU 101 determines whether each of the calculated equations of the line segments passes through the placement range of the object. CPU 101 determines microphone 302 corresponding to a line segment that does not pass through the placement range of the object (does not cross the obstacle) as microphone 302 in which the object is not present between sound source position P and microphone 302 (S303). Memory (recording medium) 102 stores, as a database, digital values of all coordinates corresponding to the placement range of the object, in the coordinate system arbitrarily defined in the space.

CPU 101 then determines whether the line segments pass through the placement range of the object, by calculating digital values of all possible coordinates taken by the equations of the line segments calculated in step S302, and comparing the calculated digital values with the coordinates at which the object is located, which are stored in the database in memory 102.

In the example illustrated in FIG. 5, coordinate values (2dx, 2dy), (3dx, 2dy), (4dx, 2dy), (2dx, 3dy), (3dx, 3dy), and (4dx,3dy) correspond to the placement range of the object, and the equation of the line segment connecting sound source position P to position Pa of microphone 302a can take coordinate values of (3dx, 2dy) and (3dx, 3dy). Accordingly, the line segment connecting sound source position P to position Pa of microphone 302a is determined to pass through the placement range of the object. Whereas, the line segment connecting sound source position P to position Pb of microphone 302b is determined not to pass through the placement range of the object. With the above operations, CPU 101 specifies microphones 302 in which the object is not present on the line segments connecting sound source position P to the positions of respective microphones 302.

When determining that one or more microphones 302 corresponding to the line segments that do not pass through the placement range of the object are present (Yes in S303), CPU 101 selects the sound signal corresponding to microphone 302 that has the minimum one of the linear distances from sound source position P to respective microphones 302, of microphones 302 that are determined not to pass through the placement range of the object (S304).

In other words, CPU (controller) 101 selects the sound signal corresponding to microphone (sound collecting unit) 302 that has the minimum one of the linear distances between respective microphones (sound collecting units) 302 and sound source position P calculated based on the sound source position information and the sound collecting unit placement information, of microphones (sound collecting units) 302 in which the object is not present on the line segments connecting sound source position P to respective microphones (sound collecting units) 302. Further, CPU 101 may select a sound signal corresponding to microphone 302 that has a minimum one of weighted distances calculated based on weighting factors that vary depending on whether the object is present on the line segments connecting sound source position P to respective microphones 302, and linear distances between sound source position P and respective microphones 302.

When all microphones 302 are determined to pass through the placement range of the object (No in S303), CPU 101 selects a sound signal corresponding to microphone 302 that has a minimum one of the linear distances from respective microphones 302 to sound source position P (S305).

In the case of the example illustrated in FIG. 5, only microphone 302b is determined as microphone 302 corresponding to the line segment that does not pass through the placement range of the object in step S303. In other words, since microphone 302b has the minimum one of the linear distances between sound source position P and respective microphones 302 of the microphones corresponding to the line segments that do not pass through the placement range of the object, a sound signal corresponding to microphone 302b is selected. With those operations, microphones 302 in which the object is not present on the line segments connecting sound source position P to the positions of microphones 302, that is, microphones 302 that are small in attenuation of sound pressure level, which is caused by the obstacle, tend to be able to be selected.

In the present exemplary embodiment, to simplify the description, the case in which the coordinate system that is arbitrarily defined in the space where the sound collecting system is installed can be handled as a two-dimensional coordinate system ignoring the height information is described, but a three-dimensional coordinate system considering the height information may be used. In the case of the three-dimensional coordinate system, a height of the sound source position is calculated based on image data captured by two or more cameras 301 and the positional coordinates of cameras 301 stored in memory 102.

Other Exemplary Embodiments

As described above, the first to third exemplary embodiments are described as exemplifications of technique disclosed in the present application. However, the technique in the present disclosure is not limited thereto, and can be applied to exemplary embodiments subjected to various modifications, substitutions, additions, and omissions. Further, new exemplary embodiments can be made by combining each constituent element described in the above first to third exemplary embodiments. Hereinafter, other exemplary embodiments will be then illustrated.

According to the first to third exemplary embodiments, in the sound collecting system having the plurality of microphones (sound collecting units) 302 placed in the space, sound collecting device 100 appropriately selects one of microphones 302. However, a sound collecting device that respectively replaces microphones 302 with microphone arrays configured with a plurality of microphone elements, and selects a sound signal obtained as a result of signal processing on sound signals from the microphone elements may be used.

According to the first to third exemplary embodiments, in the sound collecting system having the plurality of microphones 302 placed in the space, sound collecting device 100 selects one of microphones 302 that is optimal for sound collection. However, a sound collecting device may be configured to calculate weighted sum of the sound signals obtained from the plurality of microphones 302, based on each certain condition, and to select the weighted sum of sound signals as the sound signal to be sound-collected. More specifically, in FIGS. 2 and 4, the calculation of weighted sum may be performed by making weights for sound signals obtained from microphones 302 located within the angle range from $-\theta$ to $+\theta$ relatively large, and making weights for sound signals obtained from microphones 302 located outside the angle range relatively small. Further, when the plurality of microphones 302 is present within the angle range from $-\theta$ to $+\theta$, the weighting may be made larger as the distance between sound source position P and the microphone position becomes smaller, and may be made smaller as the distance becomes larger.

The third exemplary embodiment concerns the sound collecting device for selecting the sound signal corresponding to microphone 302 that has the minimum one of the linear distances from sound source position P to respective microphones 302, of microphones 302 in which the object is not present on the line segments connecting sound source position P to the microphone positions. However, a sound collecting device may be configured to calculate weighting factors that vary depending on whether the object is present on the line segments connecting the sound source position to the positions of respective microphones 302, based on the placement information of the object, and to select a sound signal corresponding to microphone 302 that has a minimum one of the weighted distances calculated by multiplying the linear distances from the sound source position to respective microphones 302 by the weighting factors.

Hereinbefore, the exemplary embodiments are described to exemplify the technology in the present disclosure, and therefore may be subjected to various modifications, substitutions, additions, and omissions within the scope of the claims or the scope equivalent thereto.

The present disclosure is applicable to a sound collecting device for sound collection at a designated position. More specifically, the present disclosure is applicable to, for example, a sound collecting device to be installed in a cabin of a mobile body such as an aircraft.

What is claimed is:

1. A sound collecting device comprising:
a sound source position input interface that receives input of sound source position information indicating a sound source position;
an audio interface that receives input of two or more sound signals collected by sound collecting units placed at predetermined positions in advance;
a recording medium that stores sound collecting unit placement information indicating placement information of the sound collecting units; and
a controller that selects one of the sound signals output from the sound collecting units, based on the sound source position information and the sound collecting unit placement information,
wherein the controller is configured to:
determine a direction to be sound-collected at the sound source position;
determine a predetermined angle range centering around the direction to be sound-collected with the sound source position as a reference based on the sound source position and the direction to be sound-collected with a sound source;
determine sound collecting units located within the predetermined angle range and sound collecting units located outside of the predetermined angle range, from the sound collecting units; and
select a sound signal corresponding to a sound collecting unit that has a minimum one of linear distances between the respective sound collecting units and the sound source position calculated based on the sound source position information and the sound collecting unit placement information, of the sound collecting units located within the predetermined angle range.

2. The sound collecting device according to claim 1, further comprising
a video interface that receives input of images captured by one or more imaging units placed at predetermined positions in advance to capture images in a predetermined range,
wherein
the recording medium further stores imaging unit placement information indicating placement information of the imaging units,
the controller determines a face direction of a person appearing within a certain distance range from the sound source position, and
the controller sets the face direction as the direction to be sound-collected.

3. The sound collecting device according to claim 1, wherein
the recording medium stores specific position information indicating one or more specific positions in a predetermined space, and
the sound source position is selected from the one or more specific positions.

4. The sound collecting device according to claim 3, wherein
the specific positions include a position of a seat arranged in the predetermined space.

5. The sound collecting device according to claim 4, wherein
the direction to be sound-collected is a direction in which the seat is arranged.

6. The sound collecting device according to claim 1, wherein
the controller selects a sound signal corresponding to a sound collecting unit that has a minimum one of weighted distances calculated based on weighting factors determined from a relative positional relationship between the sound source position information and the sound collection unit placement information, and linear distances between the sound source position and the respective sound collecting units.

7. The sound collecting device according to claim 6, further comprising
a video interface that receives input of images output from one or more imaging units placed at predetermined positions in advance to capture images in a predetermined range,
wherein
the recording medium further stores imaging unit placement information indicating placement information of the imaging units,
the controller determines a face direction of a person appearing within a certain distance range from the sound source position, and
the controller selects a sound signal corresponding to a sound collecting unit that has a minimum one of weighted distances calculated based on weighting factors determined from a relative positional relationship between the sound source position information and the sound collection unit placement information with the face direction as a reference, and linear distances between the sound source position and the respective sound collecting units.

8. The sound collecting device according to claim 6, wherein
the recording medium stores specific position information indicating one or more specific positions in a predetermined space, and
the sound source position is selected from the one or more specific positions.

9. The sound collecting device according to claim 8, wherein
the specific positions include a position of a seat arranged in the predetermined space.

10. The sound collecting device according to claim 9, wherein
the controller selects a sound signal corresponding to a sound collecting unit that has a minimum one of weighted distances calculated based on weighting factors determined from a relative positional relationship between the sound source position information and the sound collection unit placement information with a direction in which the seat is arranged, as a reference, and linear distances between the sound source position and the respective sound collecting units.

11. The sound collecting device according to claim 1, wherein
the controller selects a sound signal corresponding to a sound collecting unit that has a minimum one of linear distances between the respective sound collecting units and the sound source position calculated based on the sound source position information and the sound collecting unit placement information, of the sound collecting units present in a predetermined direction with respect to the sound source position.

12. The sound collecting device according to claim 11, wherein
the sound source position is selected from one or more seats arranged in a predetermined direction, and
the controller selects a sound signal corresponding to a sound collecting unit that has a minimum one of linear distances between the respective sound collecting units and the sound source position calculated based on the sound source position information and the sound collecting unit placement information, of the sound collecting units present ahead of the sound source position.

13. The sound collecting device according to claim 1, wherein
the recording medium further stores placement information of an object fixedly placed in a predetermined space, and
the controller specifies sound collecting units in which the object is not present on line segments connecting the sound source position to the respective sound collecting units, based on the placement information of the object, and selects a sound signal corresponding to a sound collecting unit that has a minimum one of linear distances between the respective sound collecting units and the sound source position calculated based on the sound source position information and the sound collecting unit placement information, of the sound collecting units in which the object is not present on the line segments.

14. The sound collecting device according to claim 1, wherein
the recording medium further stores placement information of an object fixedly placed in a predetermined space, and
the controller selects a sound signal corresponding to a sound collecting unit that has a minimum one of weighted distances calculated based on weighting factors that vary depending on whether the object is present on line segments connecting the sound source position to the respective sound collecting units, and linear distances between the sound source position and the respective sound collecting units, based on the placement information of the object.

15. A sound collecting method comprising:
a first step of receiving input of sound source position information indicating a sound source position;
a second step of receiving input of two or more sound signals collected by sound collecting units placed at predetermined positions in advance; and
a third step of selecting one of the sound signals output from the sound collecting units, based on the sound source position information and sound collecting unit placement information indicating placement information of the sound collecting units,
wherein the third step includes:
determining a direction to be sound-collected at the sound source position;
determining a predetermined angle range centering around the direction to be sound-collected with the sound source position as a reference based on the sound source position and the direction to be sound-collected with a sound source;
determining sound collecting units located within the predetermined angle range and sound collecting units located outside of the predetermined angle range, from the sound collecting units; and
selecting a sound signal corresponding to a sound collecting unit that has a minimum one of weighted distances calculated based on weighting factors determined from a relative positional relationship between a position indicated by the sound source position information and positions indicated by the sound collection unit placement information, and linear distances between the sound source position and the respective sound collecting units.

16. The sound collecting method according to claim 15, wherein
the third step includes selecting a sound signal corresponding to a sound collecting unit that has a minimum one of linear distances between the respective sound collecting units and the sound source position calculated based on the sound source position information and the sound collecting unit placement information, of the sound collecting units present in a predetermined direction with respect to the sound source position.

17. The sound collecting method according to claim 15, wherein
the third step includes specifying sound collecting units in which an object is not present on line segments connecting the sound source position to the respective sound collecting units, based on placement information of the object fixedly placed in a predetermined space, and selecting a sound signal corresponding to a sound collecting unit that has a minimum one of linear distances between the respective sound collecting units and the sound source position calculated based on the sound source position information and the sound collecting unit placement information, of the sound collecting units in which the object is not present on the line segments.

18. The sound collecting method according to claim 15, wherein
the third step includes calculating weighting factors that vary depending on whether an object is present on line segments connecting the sound source position to the respective sound collecting units, based on placement information of the object fixedly placed in a predetermined space, and selecting a sound signal corresponding to a sound collecting unit that has a minimum one of weighted distances calculated based on the weighting factors and linear distances between the sound source position and the respective sound collecting units.

* * * * *